US011906357B2

(12) United States Patent
Wegmüller

(10) Patent No.: US 11,906,357 B2
(45) Date of Patent: Feb. 20, 2024

(54) ILLUMINATION DEVICE FOR A SPECTROPHOTOMETER HAVING INTEGRATED MIXING OPTICS, AND METHOD FOR ILLUMINATING A SAMPLE

(71) Applicant: X-RITE EUROPE Gmbh, Regensdorf (CH)

(72) Inventor: Mark Wegmüller, Regensdorf (CH)

(73) Assignee: X-RITE EUROPE GMBH, Regensdorf (CH)

( * ) Notice: Subject to any disclaimer, the term of this patent is extended or adjusted under 35 U.S.C. 154(b) by 52 days.

(21) Appl. No.: 17/610,369

(22) PCT Filed: May 11, 2020

(86) PCT No.: PCT/EP2020/062979
§ 371 (c)(1),
(2) Date: Nov. 10, 2021

(87) PCT Pub. No.: WO2020/229385
PCT Pub. Date: Nov. 19, 2020

(65) Prior Publication Data
US 2022/0221337 A1     Jul. 14, 2022

(30) Foreign Application Priority Data

May 10, 2019 (EP) .................... 19173900

(51) Int. Cl.
- *G01J 3/02*  (2006.01)
- *G01J 3/10*  (2006.01)
- *G01N 21/25* (2006.01)

(52) U.S. Cl.
CPC ............ *G01J 3/0208* (2013.01); *G01J 3/021* (2013.01); *G01J 3/10* (2013.01); *G01N 21/255* (2013.01);

(Continued)

(58) Field of Classification Search
CPC .. G01J 3/0208; G01J 3/021; G01J 3/10; G01J 3/0218; G01J 3/18; G01J 3/51;
(Continued)

(56) References Cited

U.S. PATENT DOCUMENTS 5,963,333 A * 10/1999 Walowit .................. G01J 3/465
356/334
7,006,690 B1   2/2006 Imura
(Continued)

FOREIGN PATENT DOCUMENTS

| DE | 102012211938 | 1/2014 |
| EP | 0525948 | 2/1993 |
| WO | 2006033032 | 3/2006 |

OTHER PUBLICATIONS

Wu, Rengmao, et al. "Design of freeform illumination optics." Laser & Photonics Reviews 12.7 (2018): 1700310 (Year: 2018).*
(Continued)

*Primary Examiner* — Tarifur R Chowdhury
*Assistant Examiner* — Carlos Perez-Guzman
(74) *Attorney, Agent, or Firm* — Hahn Loeser & Parks LLP

(57) ABSTRACT

An illumination device for a spectral optical measurement device includes arranged with respect to an optical axis of the illumination device which, during a measurement operation, extends along a normal to a center point of an area of a sample to be illuminated. One or more segments of a mirror in a shape of a ring are centered on the optical axis. The mirror has an internal reflective surface arranged such that, during the measurement operation, the internal reflective surface receives light emitted from the light source and reflects the light over the area of the sample to be illuminated. The internal reflective surface has a freeform shape in a cross-section through the internal reflective surface in a plane parallel to the optical axis (for example in which the (Continued)

optical axis lies), and, in a cross-section of the mirror in a plane perpendicular to the optical axis, the internal reflective surface is represented by a straight line.

16 Claims, 14 Drawing Sheets

(52) U.S. Cl.
CPC .............................. *G01J 2003/102* (2013.01); *G01N 2201/0627* (2013.01); *G01N 2201/0636* (2013.01)

(58) Field of Classification Search
CPC ...... G01J 3/108; G01J 3/42; G01J 3/50; G01J 2003/102; G01J 2003/104; G01N 21/255; G01N 21/31; G01N 21/57; G01N 21/251; G01N 21/474; G01N 21/33; G01N 21/35; G01N 2201/0627; G01N 2201/0636
See application file for complete search history.

(56) References Cited

U.S. PATENT DOCUMENTS

2010/0277728 A1  11/2010  Imura
2011/0109908 A1   5/2011  Sumiyoshi

OTHER PUBLICATIONS

International Search Report related to PCT/EP2020/062979, dated Sep. 1, 2020 (4pgs.).
Written Opinion of the International Searching Authority related to PCT/EP2020/062979, dated Sep. 1, 2020 (6pgs.).

* cited by examiner

ILLUMINATION DEVICE FOR A SPECTROPHOTOMETER HAVING INTEGRATED MIXING OPTICS, AND METHOD FOR ILLUMINATING A SAMPLE

CROSS REFERENCE

The present application is a National Stage Entry of International Patent Application number PCT/EP2020/062979, filed May 11, 2020, entitled "ILLUMINATION DEVICE FOR A SPECTROPHOTOMETER HAVING INTEGRATED MIXING OPTICS, AND METHOD FOR ILLUMINATING A SAMPLE"; which claims priority from EP Regional Application 19173900.2, filed May 10, 2019, entitled "ILLUMINATION DEVICE FOR A SPECTROPHOTOMETER HAVING INTEGRATED MIXING OPTICS, AND METHOD FOR ILLUMINATING A SAMPLE". All of the applications and/or patents are incorporated herein by reference, including their specifications.

FIELD OF INVENTION

The present invention relates to spectrophotometry and in particular to an illumination device for a spectral optical measurement device, in which a light source illuminates a sample to be measured. The invention further relates to a method for illuminating a sample, and to a spectral optical measurement device (for example, a spectrophotometer or colorimeter) including the illumination device.

BACKGROUND

Spectrophotometers are used to measure the spectral reflection or transmission characteristics of a sample material. Spectrophotometers are used, for example, to determine color characteristics of materials. Some spectrophotometers are also adapted to further characterize additional surface features of a material, for example one or more of gloss parameters or, texture, and derive appearance metrics. A standard geometry used in spectrophotometers is the so-called (45°a:0°) geometry in which the sample is illuminated at an angle of incidence of 45 degrees with respect to the normal to the surface of the sample, and the light reflected from the sample is received at an angle of 0 degree with respect to the normal.

U.S. Pat. No. 8,345,230 describes an illumination apparatus which follows the (45° a:0°) or (45°c:0°) measurement geometry. A white planar light source having Lambertian characteristics is positioned above the sample centered along the normal passing through a center of a measured area of the sample. In order to reduce changes in illuminance during a scanning operation and better maintain the (45°a:0°) geometry despite fluctuations in distance from the sample surface caused by the scanning operation, a cylindrical mirror having an internal reflective surface is also centered on the normal and is positioned between the surface of the sample to be measured and a Lambertian diffuse light source so as to reflect the light from the Lambertian diffuse light source at an angle of incidence of 45 degrees relative to the normal onto the sample surface. The reflected light is received at an angle of 0 degrees relative to the normal by a reflecting mirror which directs the collected light through an objective lens and downstream to a spectrometer for analysis. Any radial cross-section of the internal reflective surface is parallel to the normal on the sample surface. When viewing the sample surface from above along the normal, the shape of the internal reflective surface is circular or polygonal.

In some spectrophotometers, it is additionally desired to provide illumination from a plurality of colored light sources. For color measurement instrumentation which use a plurality of white and/or colored light sources, additional components in the form of mixing optics are added to the light source of the illumination apparatus in order to homogenize the light sources in the spatial and angular domains before the light enters the imaging optics which provides the illumination light path for the (45°a:0°) measurement geometry. Mixing in the spatial and angular domain means that for every wavelength and at every spatial point of the emitting area essentially the same angular emission characteristics is achieved. These additional components, for example, are in the form of an integrating sphere, a mixing light guide and/or a strong diffuser sheet. U.S. Pat. No. 5,268,749 provides a typical example of mixing using such additional components. In the present invention, the mixing optics is not incorporated with the light source part of the illumination as in prior art, but incorporated into the imaging optics part of the illumination. This allows more flexibility, e.g. the light source after mixing does no longer need to have a Lambertian diffuse emission behavior, and more cost-efficient and compact set-ups are feasible. U.S. Pat. No. 7,006,690 discloses a color measuring head is provided with an illuminating unit, a light receiving optical system, a color image pickup unit, a drive controller and a measurement controller, and picks up an image of a test chart as a measurement specimen placed to face a specimen opening through a ring-shaped reflector. US 2010/277728 A1 discloses an illumination apparatus to illuminate a sample surface with excellent illumination efficiency and a reflective characteristics measuring apparatus using the illumination apparatus. The illumination apparatus includes a plane light source positioned on a normal at a center of the sample surface and a ring-shaped mirror having an internal reflective surface positioned between the plane light source and the sample surface.

Aspects of the present invention, examples, and exemplary steps and their embodiments are disclosed in the following. Different exemplary features of the invention can be combined in accordance with the invention wherever technically expedient and feasible.

SUMMARY

In a first aspect, the present invention provides an illumination device for a spectral optical measurement device (such as a spectrophotometer or colorimeter). The illumination device includes a light source arranged with respect to an optical axis (OA, FIG. 2) which, during a measurement operation, extends along a normal to a center point of an area of a sample to be illuminated. One or more segments (a segment being represented for example by one or more facets) of a mirror in a shape of a ring are centered on the optical axis. The one or more segments are disposed in a circular direction along the circumference (for example, inner circumference) of the ring, specifically the ring-shaped mirror. The mirror has an internal reflective surface arranged such that, during the measurement operation, the internal reflective surface receives light emitted from the light source and reflects the light over the area of the sample to be illuminated. The internal reflective surface has a freeform shape in a radial cross-section of the internal reflective surface (i.e. intersection of the reflective surface with a plane including the optical axis OA), and is a straight, i.e. non-curved line in a tangential cross-section through the internal reflective surface (i.e. intersection of the reflective surface with a plane perpendicular to OA). Alternatively, the line could be curved instead of straight, leading to non-flat facets.

In one example, the illumination device for a spectrophotometer, the illumination device comprises a light source arranged with respect to an optical axis of the illumination device which, during a measurement operation, extends along a normal to a center point of an area of a sample to be illuminated; and at least one segment of a mirror in a shape of a ring centered on the optical axis, the mirror having an internal reflective surface arranged such that, during the measurement operation, the internal reflective surface receives light emitted from the light source and reflects the light over the area of the sample to be illuminated, the internal reflective surface having a radial cross-section with a freeform shape.

In a further example of the illumination device, the light source includes a plurality of light-emitting diodes (LEDs), at least two of the LEDs being different from each other by having at least one of different colors, different color temperatures, different power spectral distributions and different shapes of radiance. In a further development of this example, the plurality of LEDs include four LEDs, including at least two LEDs having different spectral power distributions and at least one LED that is larger than one of the other LEDs.

In a further example of the illumination device, the freeform shape of the radial cross-section is defined by application of the edge ray principle to a size of the light source, a size of the area of the sample to be illuminated and a cone angle. The freeform shape can be approximated by small straight (i.e. non-curved), or curved lines, such that one would get a faceted internal reflective surface both in radial and tangential directions.

In a further example of the illumination device, focusing power of the freeform shape of the internal reflective surface varies along a height of the at least one segment of the mirror.

In a further example of the illumination device, the at least one segment of the mirror includes at least two facets.

In a further example of the illumination device, the mirror includes at least two segments with one or more spaces between the segments, the segments and the spaces together forming the ring.

In a further example of the illumination device, the at least one segment of the mirror is in the shape of a full ring. In a further development of this example, the full ring is facetted.

In a further example of the illumination device, a size of the area of the light source is smaller than the area of the sample to be illuminated.

In a second aspect, the invention is directed to a spectral optical measurement device, for example a spectrophotometer or a colorimeter, comprising the illumination device according to the first aspect.

In a third aspect, the invention is directed to a method for illuminating a sample during a measurement operation using the illumination device according to the first aspect and/or the spectral optical measurement device according to the second aspect, the method comprising:

emitting light using a light source arranged within an area around an optical axis of the illumination device which extends along a normal to a center point of an area of a sample which is illuminated during the measurement operation; and deflecting the light by an internal reflective surface of at least one segment of a mirror in a shape of a ring centered on the optical axis, the internal reflective surface being arranged such that the internal reflective surface receives the light emitted from the light source and reflects the light over the area of the sample, the internal reflective surface having a freeform shape at least substantially in a direction of the optical axis, wherein, in a cross-section of the mirror in a plane perpendicular to the optical axis, the internal reflective surface being represented by a straight, non-curved line.

In an example of the method according to the third aspect, the light source includes a plurality of light-emitting diodes (LEDs), at least two of the LEDs being different from each other by having at least one of different colors, different color temperatures, different power spectral distributions and different shapes of radiance.

In a further example of the method according to the third aspect, the plurality of LEDs include four or more LEDs, including at least two LEDs having different spectral power distributions and at least one LED that is larger than one of the other LEDs.

In a further example of the method according to the third aspect, the freeform shape is defined by application of the edge ray principle to a size of the light source, a size of the area of the sample to be illuminated and a cone angle.

In a further example of the method according to the third aspect, focusing power of the freeform shape of the internal reflective surface varies along a height of the at least one segment of the mirror.

In a further example of the method according to the third aspect, the at least one segment of the mirror includes at least two facets.

In a further example of the method according to the third aspect, the mirror includes at least two segments with one or more spaces between the segments, the segments and the spaces together forming the ring.

In a further example of the method according to the third aspect, the at least one segment of the mirror is in the shape of a full ring. In a further development of this example, the full ring is facetted.

In a further example of the method according to the third aspect, a size of the light source is smaller than the area of the sample which is illuminated by the light after being deflected by the internal reflective surface of the mirror having the freeform shape.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 9:
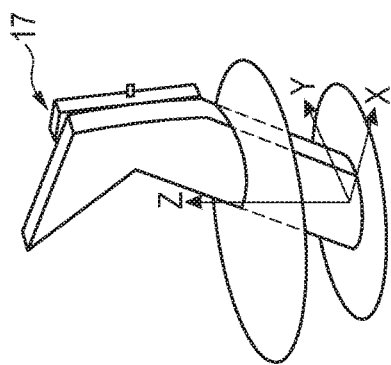
FIG. 9 shows an analysis of mixing results from a single facet of the mirror having the freeform internal reflective surface.
Figure 9:
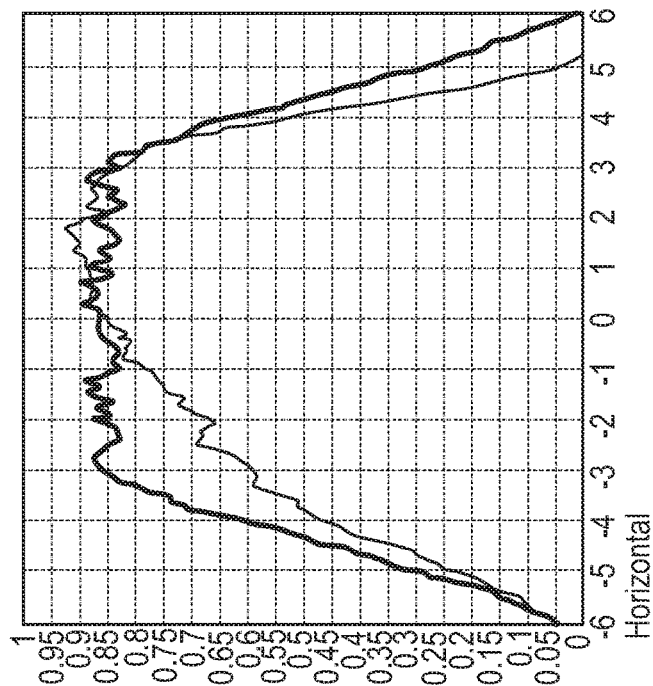
Figure 9:
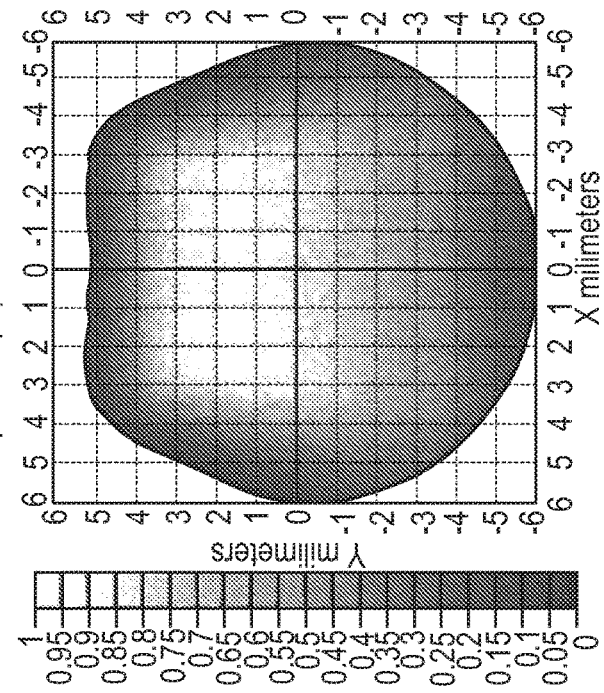
Figure 10:
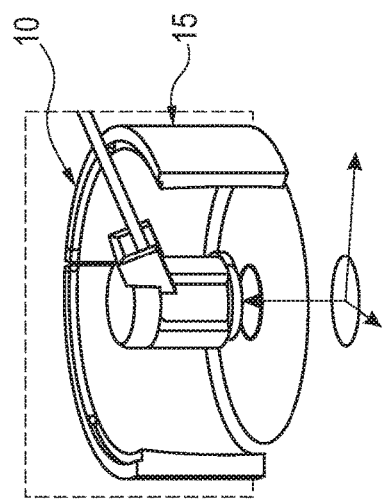
FIG. 10 shows an analysis of mixing results from a facetted ring mirror having the freeform internal reflective surface.
Figure 10:
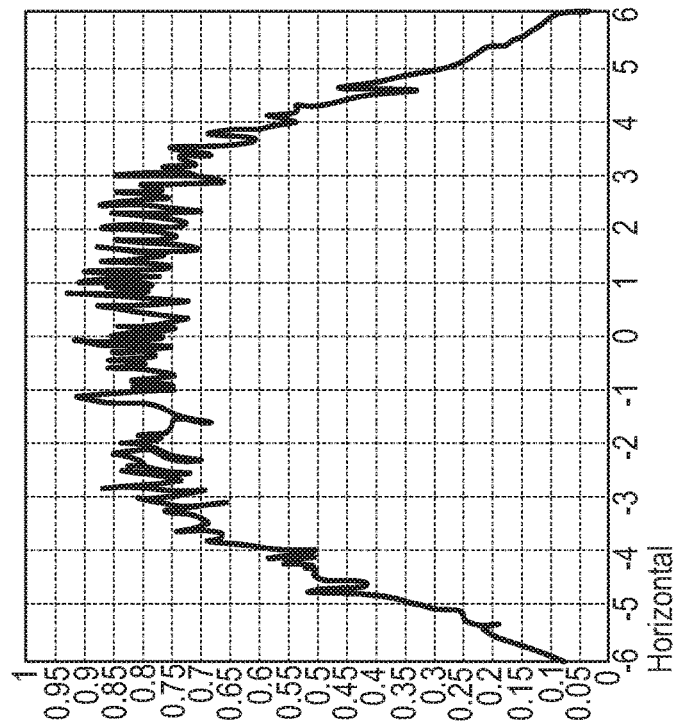
Figure 10:
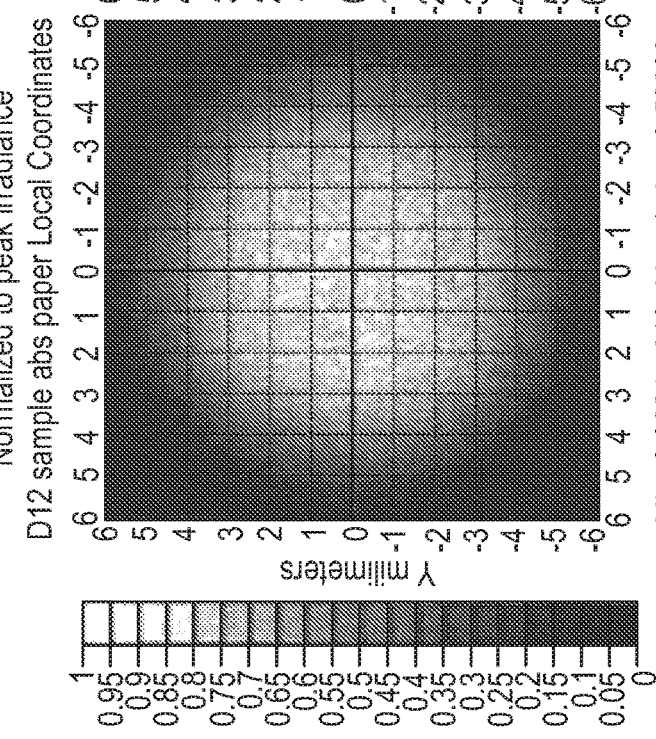

Optical components used for mixing light from illumination sources of different colors or color temperatures, usually induce one or more of a decrease in radiant intensity, an increase in cost, and an increase in physical dimensions. According to embodiments of the present device, mixing of light from a plurality of light sources illuminating simultaneously at a plurality of wavelengths is induced by a mirror formed as a surface of revolution around the embodiment's optical axis and comprising a plurality of facets arranged on the mirror's inner surface. Compared to other solutions, for example: i) solutions with a direct optical path from illumination source to target; ii) solutions comprising a smooth cylindrical mirror to reflect light from illumination sources onto the target; or iii) solutions comprising a plurality of mirrors, for example flat mirrors arranged around a circle or a cylinder, embodiments of the present device enable a broader range of uses and improved measurements. For example, compared to other solutions, the faceted mirror of the embodiment improves the smoothness, flattens the top, and extends the breadth of the illuminated spot's intensity distribution (FIGS. 9, 10). Therefore, compared to other solutions, the faceted mirror of the embodiment provides for improved light distribution and uniformity of illumination intensity over a broader area. Furthermore, embodiments of the present device can be made more compact than other solutions and at a lower cost by reducing the need for additional components, for example one or more of mixing chamber, mixing light rod. Embodiments of the mirror that is comprised in embodiments of the present device may, compared to other optical configurations, for example optical configurations comprising a diffusive filter between light source and target, induce less loss of light intensity. Combining the mixing properties with the optical imaging part of the illumination also provides a more efficient control of the measurement angles (mixing of the light only needs to be considered within the required cone angles), and greater solid angle coverage for collection of light from illumination source to illuminated target is achieved, resulting in an increased power throughput.

Figure 1:
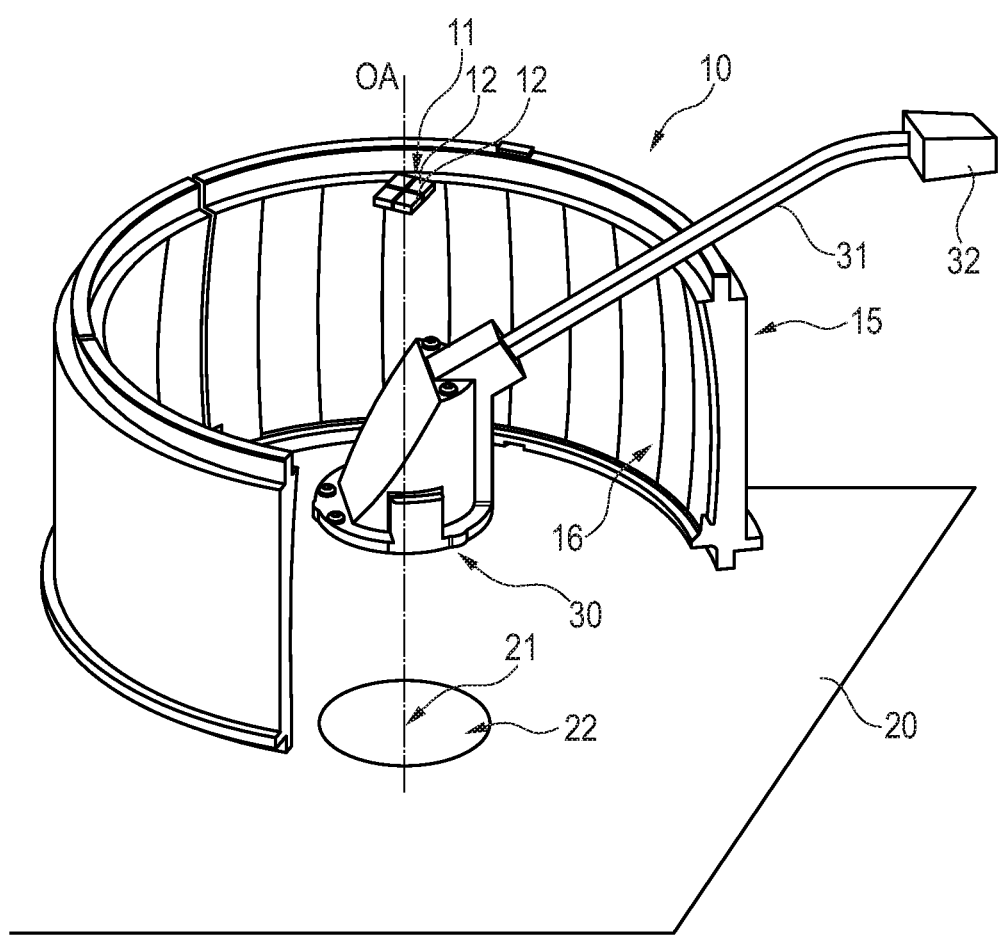
FIG. 1 is a schematic perspective of an illumination device according to an embodiment of the present invention; a pick-up optical system is also shown.
Figure 2:
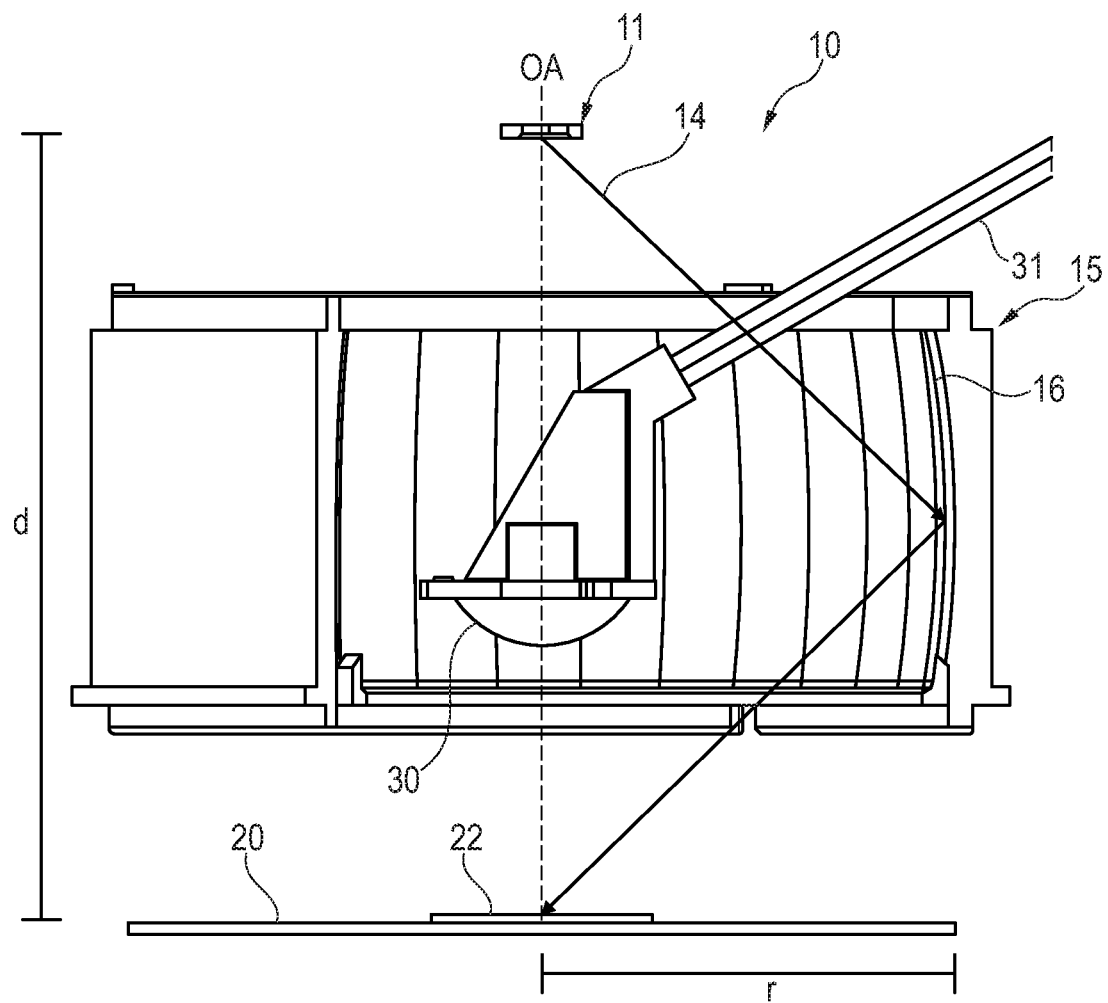
FIG. 2 is a front view of the illumination device; a pick-up optical system is also shown FIGS. 3a)-i) show special embodiments for a light source accommodated within the maximum source area of the optical design of embodiments of the present invention.

FIGS. 1 and 2 schematically illustrate an exemplary illumination device 10 including a light source 11 and a mirror 15 each positioned along an optical axis OA extending along the normal to a center point 21 of an illuminated area 22 of a sample 20. FIG. 1 is a perspective view and FIG. 2 is a front view. In each view, a segment of the mirror 15 is removed to provide a better view of the internal reflective surface 16 of the mirror 15. Along the optical axis OA, the mirror 15 is positioned between the illuminated area 22 of the sample 20 and the light source 11. In the embodiment shown in FIGS. 1 and 2, the radial distance r from the optical axis OA to the center of the internal reflective surface 16 is at least substantially equal to half the distance d along the optical axis OA between the surface of the sample 20 and the light source 11 or lies in an interval ranging from d/2−0.2 d to d/2+0.2 d (e.g. for 45°±5° angular distribution), but other relationships are also possible in accordance with embodiments of the present invention. The center of the surface 16 is defined as the reflection point imaging the center of the light source 11 to the center of the sample 20. Consequently, light 14 emitted from the light source 11 is reflected from the internal reflective surface 16 mirror 15 and illuminates the sample 20. The light 14 is then reflected from the sample 20 approximately along the optical axis OA to the pick-up optics 30. The pick-up optics comprise, for example, one or more of a lens, a reflector, and a light guide port, for example an optic fiber port or socket. In some embodiments, the lens is a spherical or an aspheric lens. The reflector is, for example, a plane oriented to reflect light from the lens' optical axis towards the optic fiber port's optical axis. The reflector is for example a mirror based on total internal reflection. The optic fiber port is, for example, a surface, for example a flat surface or a surface curved to form a lens, against which an optic fiber or an optic fiber bundle receives light collected by the lens. In some embodiments, the pick-up optics assembly are equivalent to a telecentric lens in the space of the sample measurement plane. The pick-up optics are, for example, integrated as a single component, for example molded from a transparent polymer. The optic fiber port is, for example, a cylindrical cavity within the single component. The optic fiber 31 guides light from the pick-up optics 30 to the detector 32. In some embodiments, the light guide, for example, spatially homogenizes and depolarizes the input light. In another example embodiment, the light guide is one or more of integrated with the pick-up optics assembly, for example as a light pipe, or provides free-space coupling to the detector 32.

The detector 32 comprises, for example, a spectrometer. An embodiment of a spectrometer 32 comprises, for example, a grating and a photodetector, for example a linear photodetector array, for example a photodetector matrix. The photodetector is, for example, a CMOS semiconductor or a CCD semiconductor. Alternative embodiments of the detector 32 comprise, for example, a colorimeter, for example comprising a set of colored filters positioned between the incoming light from the optic fiber and the photodetector. Other embodiments for a detector are one or more of: a spectrometer comprising an entry slit, a holographic focusing grating, and a diode array detector, for example one or more of a CMOS diode array detector, a detector array with color filters, and a linear variable filter (LVF); a Fourier transform spectrometer (FTS); and a colorimeter with a plurality of (for example three) color filters. It can also be an imaging sensor with different spectral filters, thereby allowing for both spatial and spectral resolution.

Figure 3:
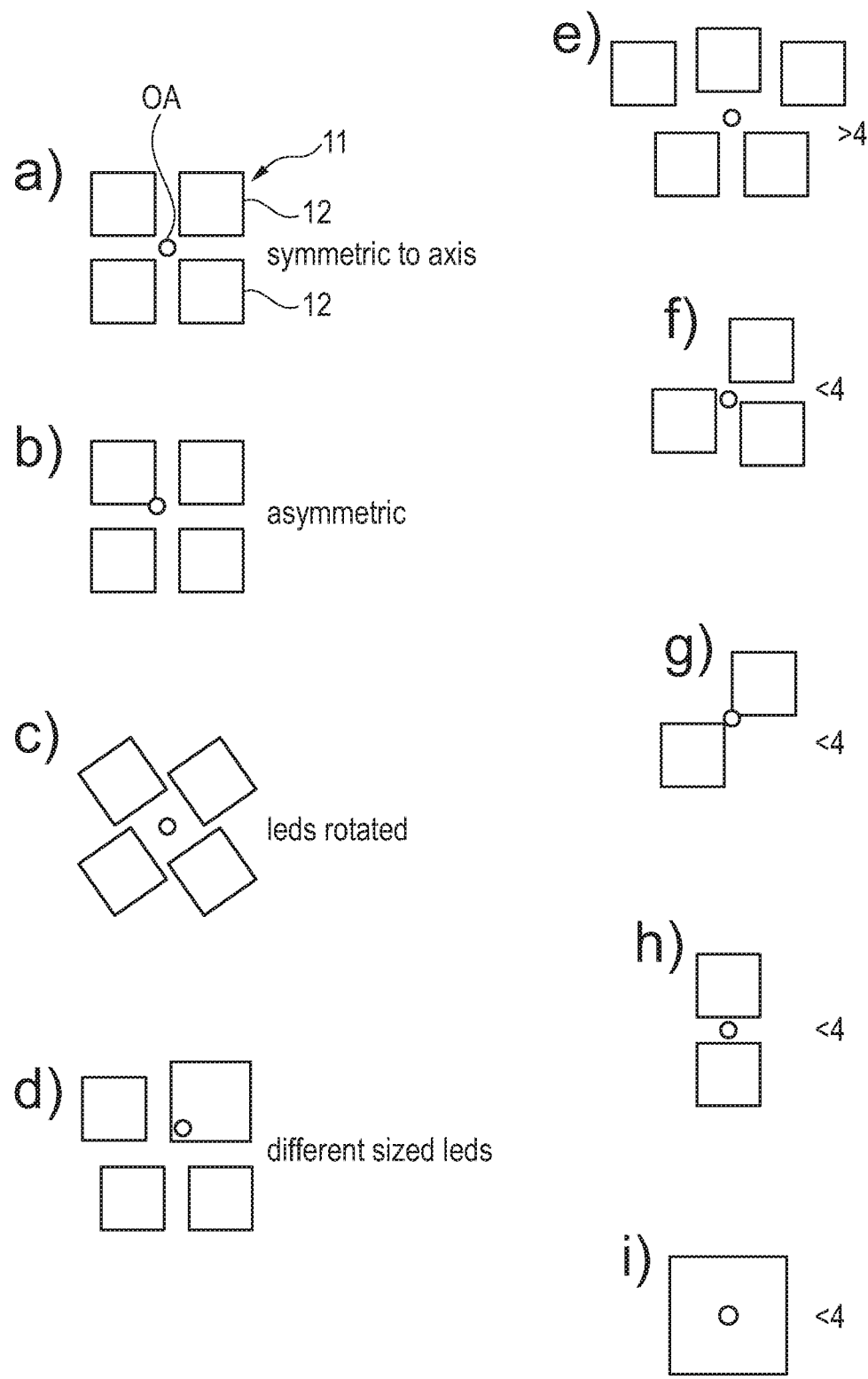

FIGS. 3a)-i) show different embodiments of the light source 11. The light source 11 comprises a plurality of light-emitting components, for example light-emitting diodes (LEDs) 12, which, in combination, emit light at two or more wavelengths, for example two or more wavelength ranges. In some embodiments each LED may emit light of a different color, for example a different visible or non-visible color or colors. Different LED colors may for example be selected from one or more of white, blue, green, red, infrared, violet, or ultraviolet. In some embodiments, the light that is combined or mixed at the surface of sample 20 may correspond to a light of a certain standard illuminant, for example one or more of CIE A, B, C, D, E, F, and L illuminants, for example one or more of D50, D55, D65, and D75 illuminants. Some embodiments of the device comprise a plurality of light sources 11. For example, each light source 11 is activated by illuminating different LED's, alone or in a plurality, for example by illuminating different pairs of LED's, for example by illuminating two or more LED's in synchrony or with overlapping durations. For example, a white and an ultraviolet are illuminated together, for example in synchrony. In some embodiments, the illumination of a pair of LED's is followed by the illumination of only one LED or another pair of LED's or a plurality of LED's. In a different exemplar embodiment, each different light source 11 is mechanically positioned or brought into alignment with the optical axis OA prior to acquiring one or more measurements. The quality of mixing and high throughput provided by the mirror design according to embodiments of the present invention typically fall-off outside the design area. The LEDs of source 11 should therefore be mostly contained within this design area to assure an efficient and well mixed illumination of the sample. Usually, the Leds are therefore arranged as closely as possible around the optical axis OA. Leds that can afford a lower throughput, or a lower quality of mixing, can be moved further out than LEDs that require the best possible throughput and/or mixing. For example, an embodiment of the illumination device comprises 4 LED's 12. The LED's are for example arranged symmetrically with respect to the optical axis OA, for example to form a square or rectangle, as shown in FIG. 3a). However, other possible embodiments include one or more of: an asymmetric arrangement with respect to the optical axis OA (FIG. 3b)); the LEDs rotated, for example in-plane, and arranged symmetrically with respect to the optical axis OA (FIG. 3c)); different sized LEDs (FIG. 3d); one of the LEDs overlapping the optical axis OA (FIG. 3d)); more than four LEDs (FIG. 3e)); and less than four LEDs in different arrangements, for example in a triangle (FIG. 3O, with aligned diagonals aimed at the optical axis (FIG. 3g), or in one or more columns (FIG. 3h). In FIG. 3i), a single light source is for example arranged centered on the optical axis OA, where the possibly non-homogeneous light emission (spatial and angular domain) will be homogenized by the present mixing optics. Except for the embodiment of FIG. 3i), a light source 11 comprises at least two LEDs 12 selected from the group of: LEDs emitting different power spectral densities (including colored LEDs and white LEDs of different color temperatures), and LEDs with the same power spectral density, but different shapes of radiance (for example one or more of spatial and angular radiance distribution). It is also possible according to an embodiment for the at least two LEDs to be the same and have various positional arrangements with respect to the optical axis OA. Moreover, the LEDs 12 in an example have different sizes (see FIG. 3d) in order to provide weighting to the LEDs 12, for example for a first color to provide a stronger illumination intensity than a second color. For example, in the embodiment of FIG. 3d), the larger LED(s) is for example a white LED and/or a cyan LED. In order to weight these spectrums stronger than the other smaller LEDs (for example, one or more of an ultraviolet LED and a blue LED).

For example, to cover a measurement wavelength range of 380 to 730 nm, the LEDs 12 for example include one or more of: a white LED which, for example, illuminates over the wavelength range from 420 to 700 nm; an ultraviolet/blue LED which, for example, illuminates over a wavelength range below 420 nm; a cyan LED; and a near-infrared or red LED which, for example, illuminates over a wavelength range above 700 nm. The combination of the white, the ultraviolet, the cyan, and the near-infrared or red LED's provides a method for a color measuring apparatus, for example a device comprising a facetted ring mirror, to generated an illumination that is of uniform intensity over a broad range of wavelengths, for example from 380 to 730 nm, whereby the illumination intensity dip in the white LED's spectrum is compensated by the cyan LED's illumination, and whereby the limited spectrum of the white LED is extended by the illumination provided by the ultraviolet LED and the near-infrared or red LED. According to one embodiment, the LEDs 12 are each around 1 mm×1 mm in size. In one embodiment, one or more of a total width, diagonal, or diameter of the zone comprising LED's on light source 11 is about 3 mm. Other colors and arrangements of LEDs 12 are also possible to form a different radiance spectrum and pattern. For example, one arrangement could include green, blue, and red LEDs 12. Another arrangement could include a plurality of white LEDs 12, for example white LED's with different spectral ranges or spectral distributions. The arrangements for example include white LEDs 12 of different color temperatures, as well as ultraviolet and/or near-infrared LEDs 12. Another arrangement could include a plurality of colored and white Leds where the individual LEDs could be switched on individually. Using them sequentially, in combination with a spectrally selective pick-up sensor, e.g. a spectrometer, would enable to realize a simple bi-spectral measurement system for characterization of fluorescent properties of the sample.

Preferably, because the overall shape of the mirror 15 in this embodiment is circular, the overall shape of the light source 11 is also at least substantially circular, for example having a ratio between the lengths of the half-axes of less than 3 or less than $\sqrt{2}$. In this way, losses resulting from empty spaces within or outside of the circular area can be avoided. Nevertheless, as mentioned above, even if the design of the LEDs 12 in the light source 11 deviates from a regular shape, good mixing and relatively high throughput can still be achieved. Depending on the distance d between source 11 and sample 20, their size, and the allowed incidence angles in the illuminated area 22, the collected source solid angle can be very large (e.g. π for the mirror shown in FIG. 4, which is 4 times larger than for a corresponding flat cylinder mirror.)

Figure 4:
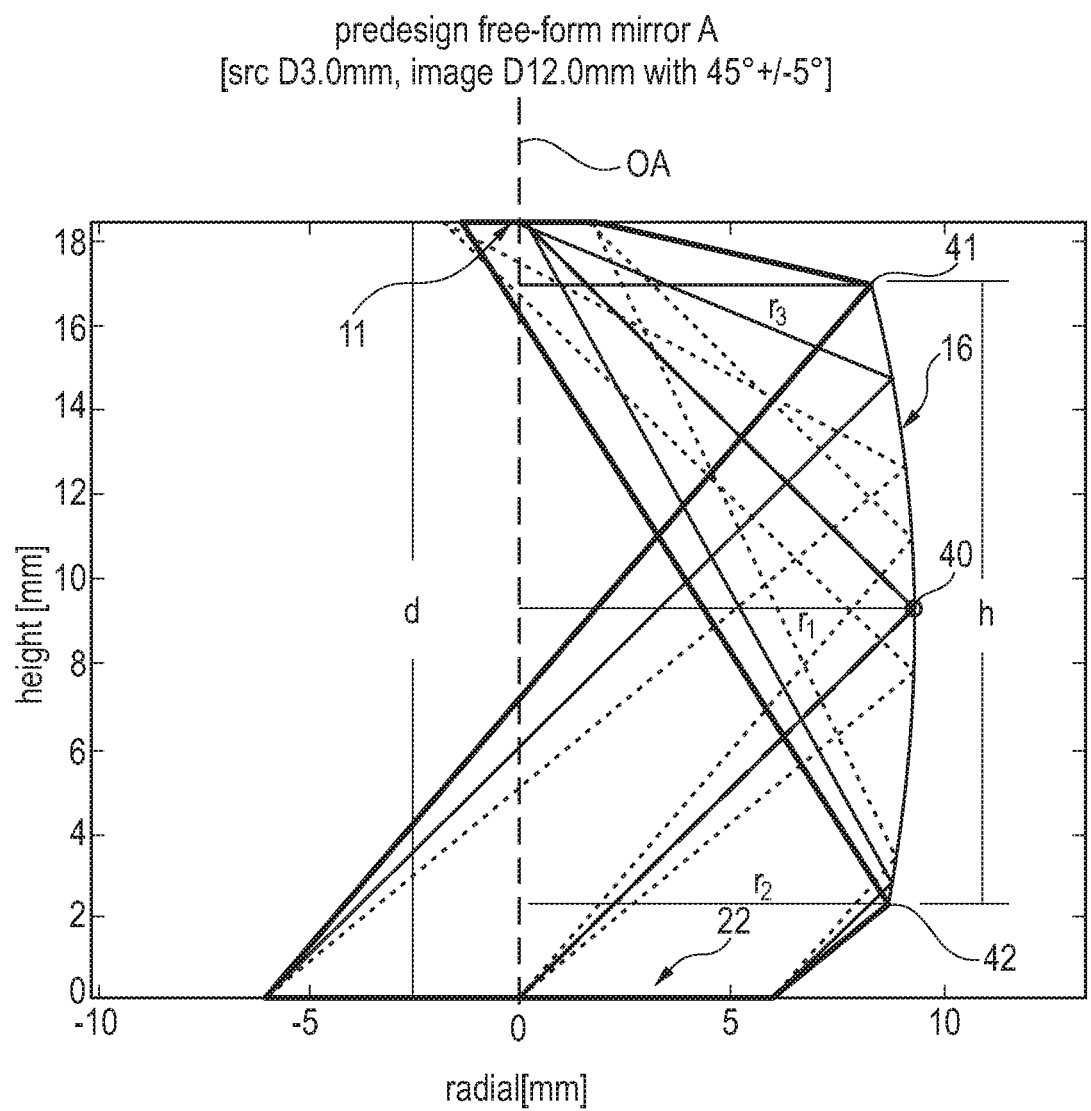
FIG. 4 illustrates a contour fora freeform surface of the internal reflective surface of the mirror according to an embodiment of the present invention.

Referring to FIG. 4, the vertical shape of the internal reflective face 16 from the front view of FIG. 2 is shown in greater detail. Here, the internal reflective surface 16 has a freeform shape, or, more precisely, a radial cross-section of the internal reflective surface 16 has a freeform shape (cross-section of a plane including the optical axis OA and surface 16). Within the context of the present application, a "freeform shape" is to be understood as being an irregular shape, including aspheric surfaces, and excludes from its definition regular shapes, such as flat, elliptical, parabolic, or hyperbolic, and shapes having common focal points over the radial cross-section. The freeform shape has been found according to embodiments of the present invention to provide for a number of advantages, including better color mixing, higher throughput and the ability to achieve a larger illuminated area 22 relative to a smaller size of the light source 11.

In the embodiment shown in FIG. 4, the construction point 40 of the radial cross-section of the internal reflective surface 16 is such that the point 40 lies on a ray from the center of the illuminated area 22 (intersection of OA with 22), and having an angle of 45° with OA (for the desired (45a:0) geometry targeted in this invention—it can be different for different target geometries). In the embodiment shown, half of the distance d between the light-emitting surface of the light source 11 and the surface of the sample 20 to be measured is at least substantially equal to the radial distance $r_1$ or lies in an interval ranging from 0.8 $r_1$ to 1.2 $r_1$ to the construction point 40. In this example, a light source 11 with an effective light-emitting surface of approximately 3 mm was used for illuminating a desired illuminated area of 12 mm with incidence angles of 45±5 degrees (FIG. 4 shows the light rays at an angle of 45 degrees in solid lines, and shows the light rays at 40 and 50 degrees in dashed lines). In this case r1=d/2=9.20 mm.

Using these design constraints, the freeform surface according to an embodiment of the present invention is determined according to the well-known edge ray principle by the border of the source being imaged to the border of the image so as to assure that light rays in between also fall within the image. In the example of FIG. 4, the left edge ray source is at −1.5 mm to the image patch at +6 mm with 50 degrees incidence, the center ray source is at 0 mm to the image patch at 0 mm at 45 degrees incidence, and the right edge ray source is at +1.5 mm to the image patch at −6 mm with 40 degrees incidence. The height h of the internal reflective surface 16 defined by the end points 41 and 42 is chosen such that the desired patch cone angle of ±5 degrees in this embodiment is achieved.

Figure 11:
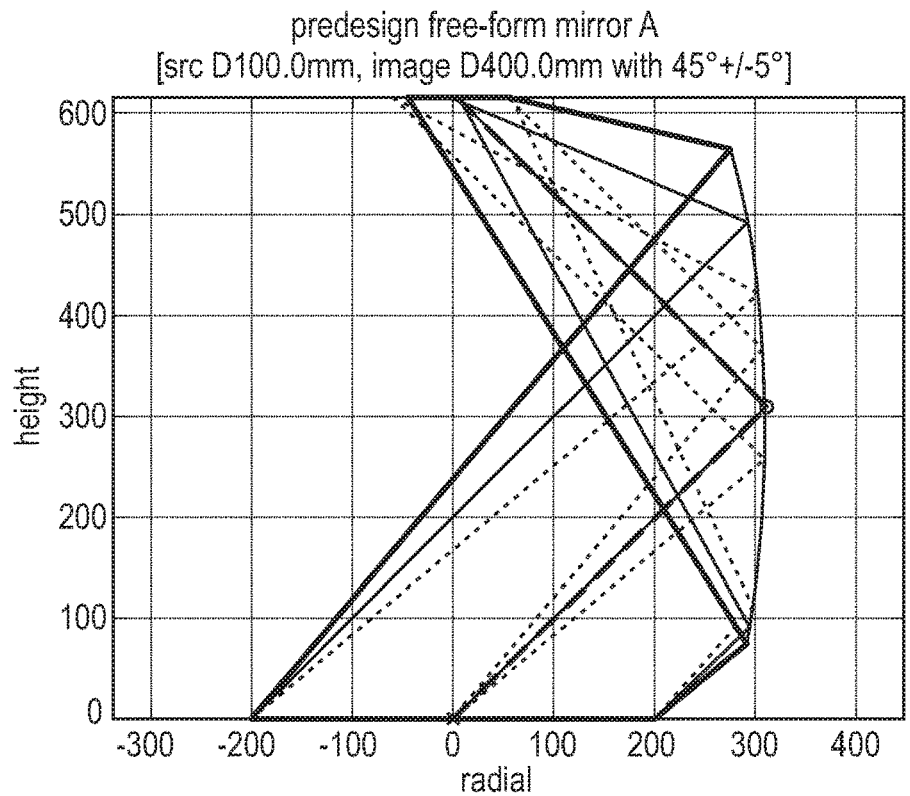
FIGS. 11 to 15 show further mirror embodiments.

The shape of the radial cross-section of the internal reflective surface 16 of the mirror 15 is then determined piecewise from the center point 40 as illustrated in FIG. 11: for an interval change+dh in mirror height h, the surface slope is modified such that it reflects the ray from P=patch_center-dp towards S=source_center+ds (i.e. locally, the mirror is an ellipse with focal points in P and S). The relation is such that if Htop-Hcenter=N*dh, then N*ds=Dsrc/2, and N*dp=Dpatch/2. The intervals dh, dp, and ds are for example chosen to be constant as in the following figures, or as a function of H, P, and S. Applying this to the example of FIG. 4, the radius $r_2$ at bottom end point 42 from the optical axis OA is 8.70 mm and the radius $r_3$ at the top end point from the optical axis OA is 8.18 mm.

The design of the freeform surface shown in FIG. 4 has been found to have a high through-put owing to the relatively large angle collected from the source and has approximately telecentric patch irradiance. However, the design is for example adapted for different applications preferably following the edge ray principle as discussed above, or alternative optical design approaches for a freeform or aspheric surface. For example, the diameter of the mirror is for example scaled to provide more or less space in the center. Moreover, different sizes of the light source 11 and/or desired illuminated area 22, and/or different desired patch cone angles, will result in different freeform shapes according to the edge ray principle being applied to the respective sizes.

According to an embodiment, the shape of the freeform surface is for example adapted to account for a light source 11 which does not have a Lambertian distribution. For example, based on the radiance distribution of the light source 11, the focusing power of the internal reflective surface 16 is for example adapted along the height h of the mirror 15 accordingly to maintain a homogenous power distribution. Therefore, if the light source 11 has greater power in larger angles of radiance compared to smaller angles, the top section of the mirror 15 receiving the larger angles of radiance for example has a lower focusing power relative to the bottom section of mirror 15.

Another design criterion for producing the shape and size of the internal reflective surface 16 according to an embodiment of the invention would be to calculate the size and shape so as to optimize the illumination intensity distribution in the measurement field in order to achieve a large insensitivity for distance variation. This would provide that the measured light level in the pick-up optics 30 stays constant for different distances. The integrated light level is determined by the illumination intensity distribution over the field for different distances.

The mirror 15 has been fabricated by, for example, using an injection mold produced using ultra-precision machining (with typically 5 or more machining axis). This results in a shape of the internal reflective surface 16, which is provided, for example, with an optical mirror coating which creates high reflectivity over the visible spectral range (e.g. in a wavelength interval ranging from ultraviolet light lying in between 305 and 380 nm to near-infrared light lying in between 730 and 1000 nm). A coating material would be a metal coating such as an aluminum or silver or gold or chrome or, more generally, a broadband dielectric coating optionally combined with additional thin film interference layers.

Figure 5:
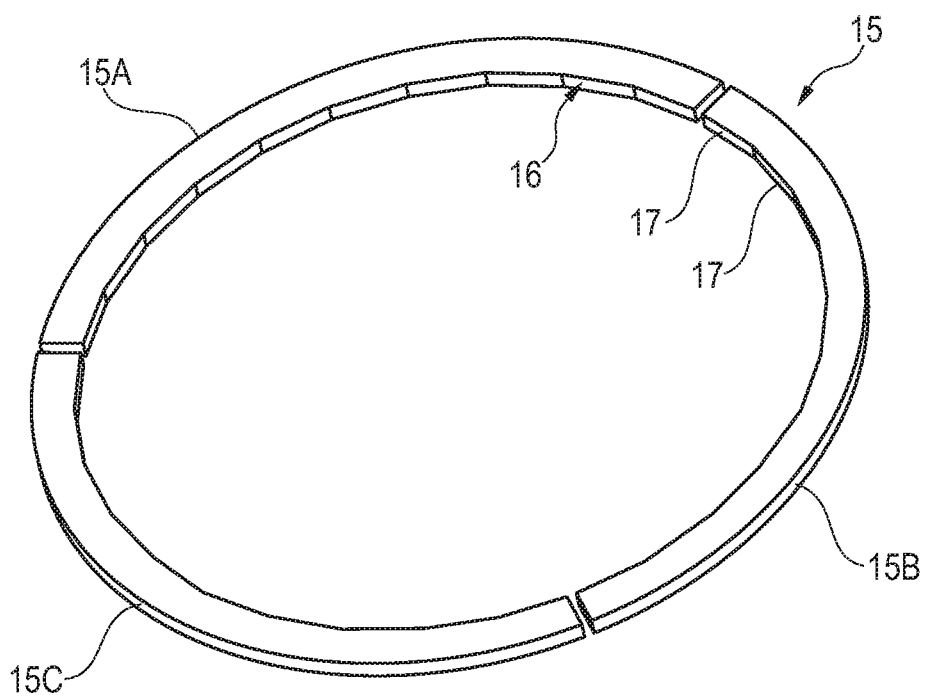
FIG. 5 is a perspective view of a horizontal slice of the mirror.

FIG. 5 is a perspective view of a horizontal slice of the mirror 15 of FIGS. 1 and 2. In this embodiment, the mirror 15 is a facetted mirror, for example a faceted ring mirror, comprising three segments. It has been found according to an embodiment of the present invention that faceting the mirror 15 into facets 17 in the circular direction (i.e. in a direction which runs circular around the optical axis of the illumination device so that for example the boundaries of the facets 17 lie parallel to the optical axis) in combination with the freeform shape of the radial cross-section of the internal reflective surface 16 in a direction which lies at least substantially parallel to the optical axis results in greatly improved mixing quality. In a cross-section through each facet 17 in a plane perpendicular to the optical axis of the illumination device (within this disclosure, also called horizontal plane or horizontal cross-section), the side of the facet 17 on which the reflecting surface facing the light source 11 lies is represented by a straight, non-curved line. The cross-section through the entire array of facets 17 in a plane perpendicular to the optical axis of the illumination device when they are installed in the ring-shaped mirror is then represented by a polygon (for example, a regular polygon having n corners, where n is the number of facets comprised in the ring-shaped mirror). In addition to the advantages of the freeform shape discussed above, the facets 17 in the horizontal direction is for example additionally used to spread hot spots of image of the light source 11 across the illuminated area 22. The internal reflective surface 16 including a plurality of facets 17 is, when viewed from above along the optical axis OA, polygonal in shape. In the embodiment shown, the mirror 15 preferably comprises n=30 facets 17 positioned at intervals of 360°/n, such as at intervals of 12 degrees with respect to each other. A number of about 30 facets 17 has been found to provide high mixing without a significant loss of pick-up power. However, also other numbers of facets are possible such as a number lying in an interval ranging from 4 to 28 (for example, 12) or in an interval ranging from 32 to 120 (for example, 75). Generally, from straightforward geometric considerations, it is obvious that broader facets 17 will spread-out more the illumination in a direction parallel to the facet, resulting in a larger loss (illumination falls outside the desired illumination area 22), but better homogenization (a single Led of source 11 covers a broader area in the illumination area 22, thereby better overlaying the other Leds of source 11 that are also spread out larger).

While the facets 17 in the embodiment shown in FIG. 5 are each the same size and are flat when viewed in the horizontal plane, according to other examples, the facets 17 have different sizes and/or have a curvature in the horizontal plane. For example, providing a curvature as depicted in FIG. 18b,c allows a relatively smaller facet 17 to achieve a broader area in the illuminated region 22 of the patch being covered, thereby enhancing the light mixing. In particular, deviating from the flat faces of the facets 17 in the circular form shown in FIG. 5 to provide stronger or weaker (e.g. flat) curvature brings additional design freedom. According to an embodiment of the present invention, the curvature across the facets when viewed in the horizontal plane for example has a freeform shape analogous to the freeform shape of the internal reflective surface 16 of the mirror 15 when viewed in the vertical plane. Thus, applying the edge-ray principle of the design to the facets 17 in the horizontal plane could better restrain/homogenize to the patch dimension parallel to the facet 17, in a similar way that the freeform shape in the vertical plane does for the dimension orthogonal to the facet 17. Further, the freeform shape of the facets 17 could vary along the height h of the mirror 15 allowing to remove/reduce the trapezoidal power distribution (FIG. 9) of a single facet.

Figure 6:
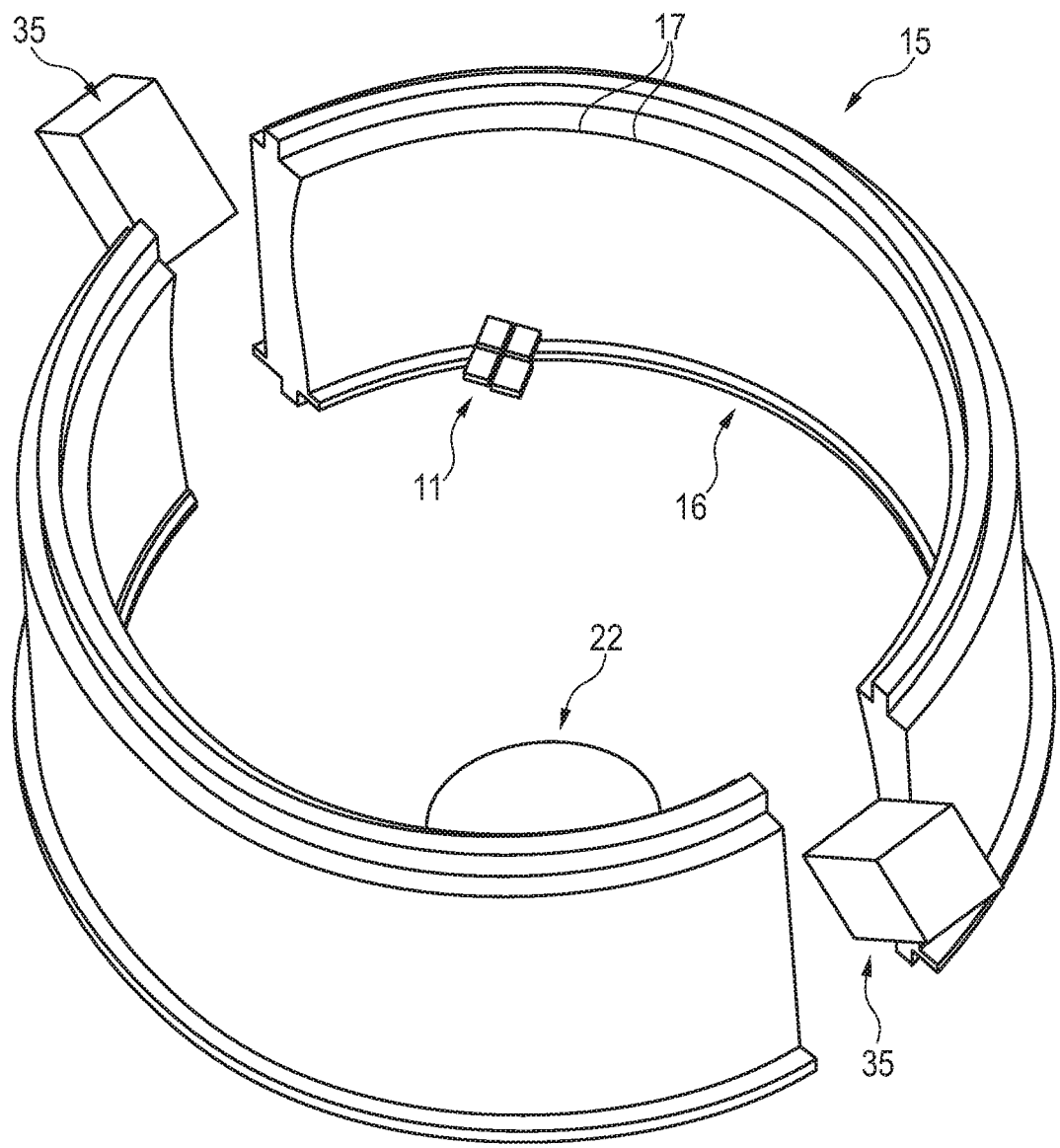
FIG. 6 is a perspective view of the illumination device with the mirror segmented to provide one or more of gloss, camera, and reference channels.
Figure 7:
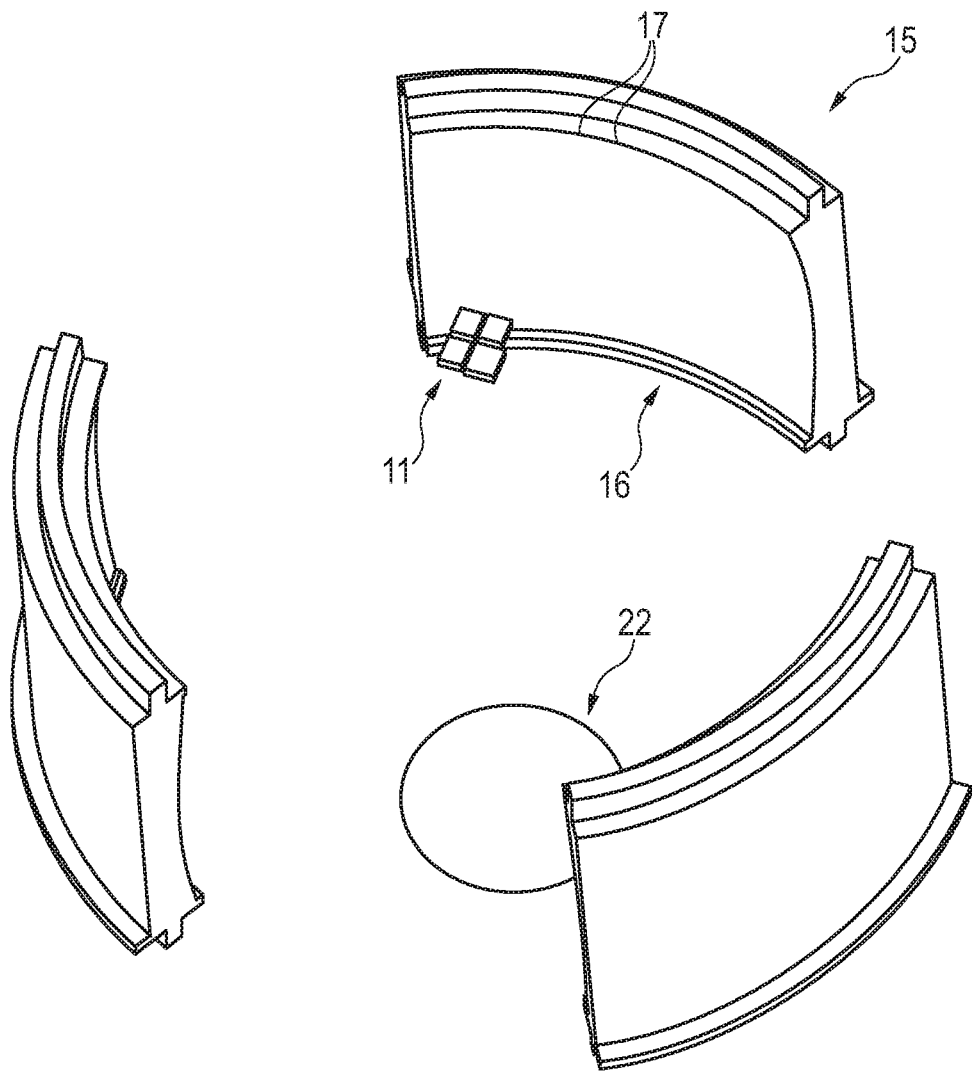
FIG. 7 is a perspective view of the illumination device with the mirror segmented to provide for ring illumination.
Figure 8:
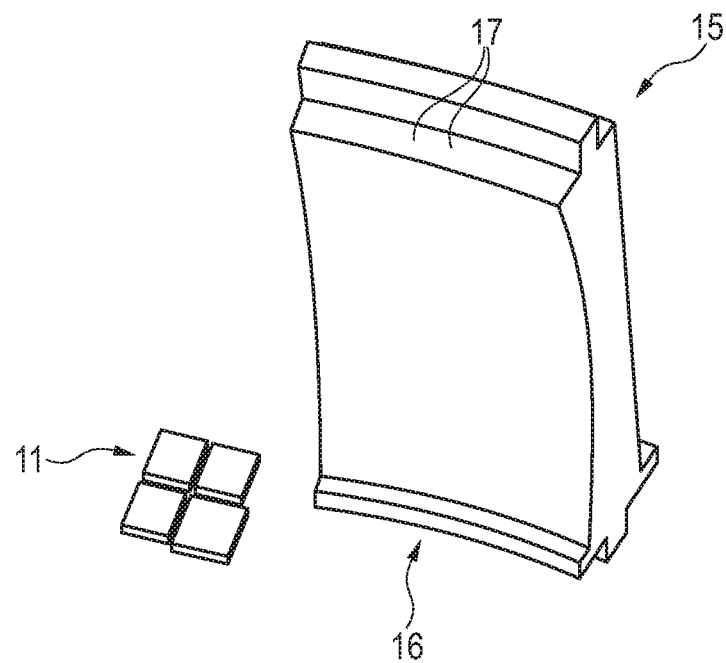
FIG. 8 is a perspective view of the illumination device with the mirror having a single segment with two facets for directional illumination.
Figure 8:
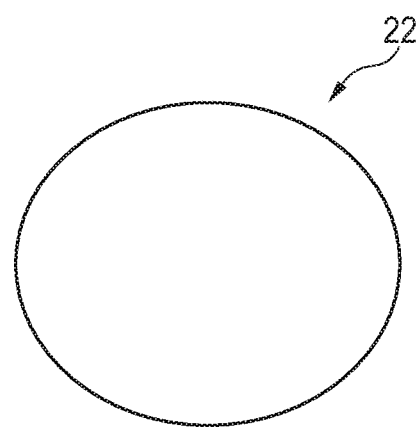

FIGS. 6-8 illustrates embodiments in which the mirror 15 does not form a full ring. As shown in FIG. 6, one or more segments or facets 17 of the mirror 15 is for example removed about the circumference of the mirror without significantly effecting mixing across the illuminated area. This can be done, for example, to provide a space for one or more additional components 35, such as a camera, or to provide for a channel for a device for determining gloss or a reference channel. As shown in FIG. 7, three segments of the mirror 15 with equally-sized spaces in between distributed about the circumference of the mirror 15 can provide for circumferential illumination. Directional illumination is for example provided for by providing one segment of the mirror 15 comprising at least one facet 17 (two facets 17 are shown in the example of FIG. 8).

The concept shown in FIG. 7 can easily be extended to foster further applications of the illumination device:
For example, each mirror segment could be optimized for its individual optical axis OA shifted from the current centered axis. With this, correspondingly decentered source areas different for each mirror segment are obtained, helping to realize an even larger overall source and illumination area. The LED light source can be split in two or multiple light sources which can be addressed and controlled individually. The light sources can lie in one plane or in different planes. The optical system can be modified by additional baffles that each light source can illuminate only one or certain segments of the mirrors.

The concept includes also that the different mirror segments can have a different optical design. This allows to implement additional measurement features.

First potential embodiment, the different light sources and optical imaging mirror segments can be designed for different illumination spot sizes. This enables to switch between different measurement spot sizes without mechanically moving parts.

A second potential embodiment: the different light sources and imaging mirrors are designed for different mechanical working distances. This enables the measurement at different distances.

A third implementation can realize different sample illumination angles with the different mirror segments. This realizes a multi-angle measurement geometry.

Another potential embodiment would be, that one light source and imaging mirror segments are realized with polarization filters, a second light source is realized without polarization filter. This enables the realization of an illumination system with switchable polarization properties.

FIG. 9 illustrates the results of a mixing analysis for a single facet 17 designed according to the design of the mirror 15 with the freeform shape according to FIG. 4 and FIG. 10 shows the results of a mixing analysis for a full facetted ring mirror 15 with the freeform shape according to FIG. 4. With respect to the mixing analysis for the single facet 17 having the freeform shape, it was found that the ability of the freeform shape to control the distribution in patch irradiance orthogonal to the mirror 15 provides significantly better mixing results than a facet with a flat face (i.e., parallel to the optical axis OA). In other words, the freeform shape being adapted to provide more homogeneous power distribution over the illuminated area 22, as discussed above, provides for directional illumination with significantly better mixing and illumination over the illuminated area 22. Moreover, as compared to flat or other shapes, the freeform surface allows for a much larger size of the illuminated area 22 compared to the size of the light source 11, as well as control of the incidence angles over the illuminated area 22.

In addition to the better mixing and other advantages of the freeform surface discussed above, the analysis has also shown that a single segment or facet, as well as an entire facetted ring mirror provide significant gains in throughput compared to a flat surface which is parallel to the optical axis OA. The freeform surface allows to collect a larger angle of light emitted from the light source and control its angle of incidence over the illuminated area 22 according to the edge ray principle and/or to achieve power distribution homogeneity. Table 1 below show the results of the analysis of the throughput of different mirror designs relative to the facetted freeform surface according to the embodiment of FIG. 4. As can be seen, relative to a cylinder mirror, one gains a factor of almost 3 in power, whereas the loss from faceting the freeform mirror is only 13% rel. to the non-facetted freeform mirror with bad mixing.

TABLE 1

| all facets have a width of 12° | relative throughput [% of source flux] | flux relative to facet freeform [%] |
|---|---|---|
| flat (cylinder mirror) | 14.0 | 36 |
| freeform | 44.5 | 113 |
| flat facetted (polygon mirror) | 12.6 | 32 |
| freeform facetted (embodiment of FIG. 4) | 39.4 | 100 |

FIGS. 11 to 15 show further mirror embodiments which are associated with the following values of different physical quantities described above in the context of FIG. 4. The edge rays are shown in bold lines, the center ray is shown as a bold dashed line, and the ray cones incident on the patch center and edges are shown in solid and dotted lines for cone center and edge rays.

FIG. 11 shows an example of a mirror calculated for a source diameter of 100 length units, an incidence angle of 45°, incidence cone angle of ±5°, patch diameter of 400 length units, and a source—patch distance of 616 length units.

Figure 12:
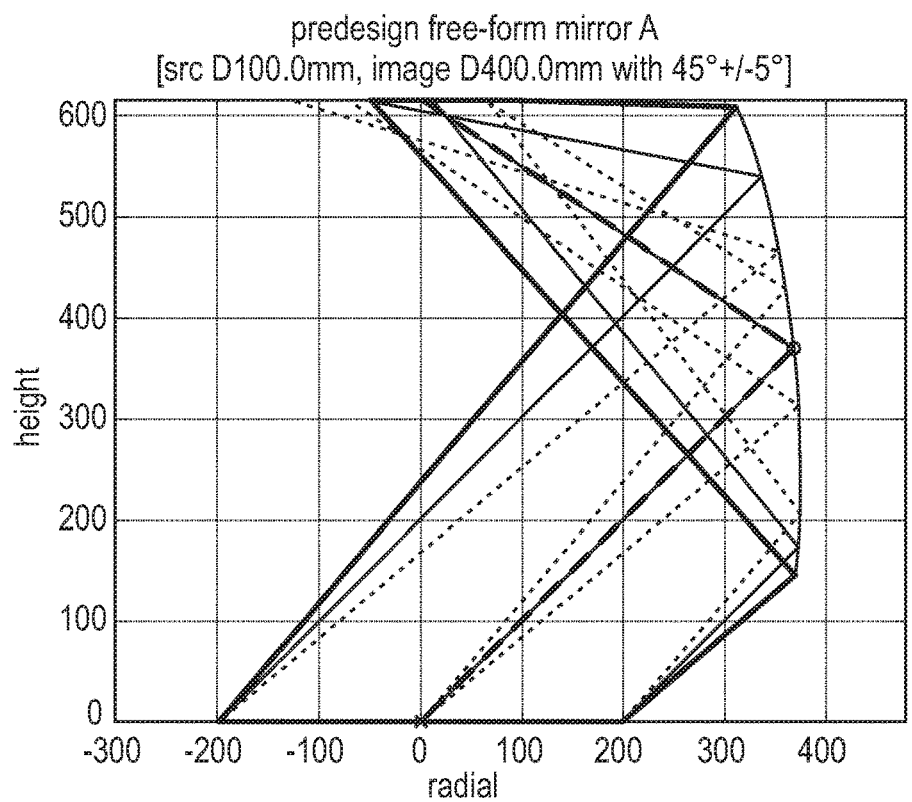
Figure 13:
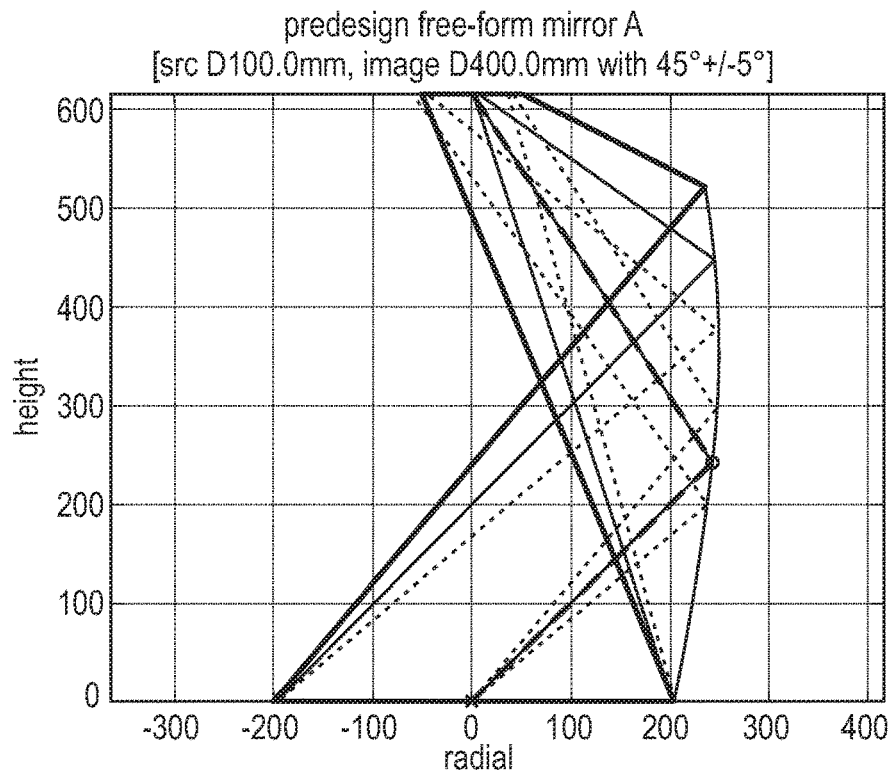

FIGS. 12 and 13 show examples of a mirror where the construction point 40 was located 20% further away (FIG. 12) and 20% closer (FIG. 13) relative to the patch center.

Figure 14:
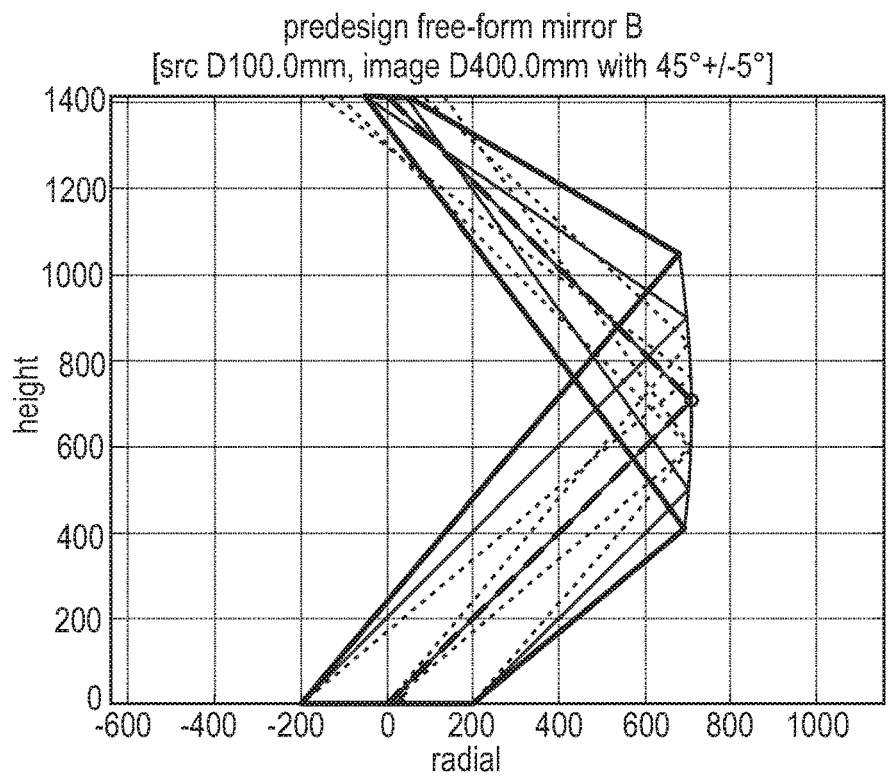

FIG. 14 shows an example of a mirror for a scaled-up source—patch distance of 1417 length units.

Figure 15:
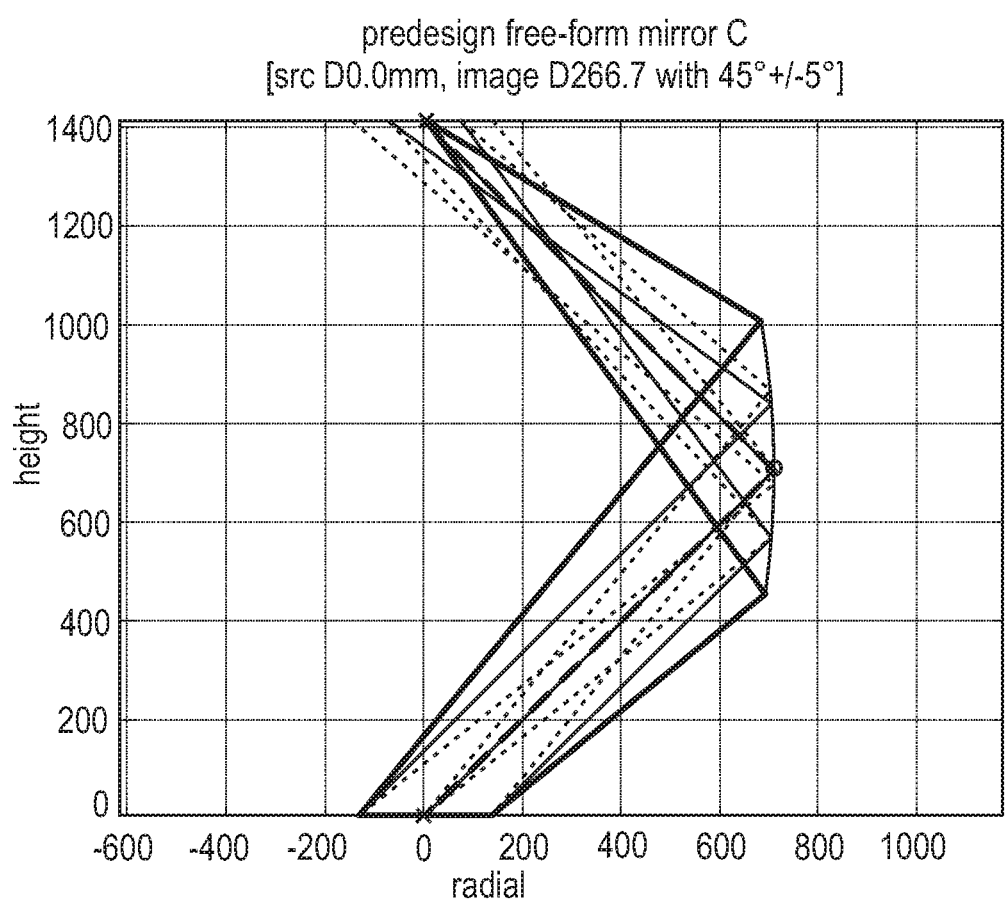

FIG. 15 finally shows an example of a mirror designed using a point source and a smaller patch width of 267 length units, as well as ±6° incidence cone angles.

Figure 16C:
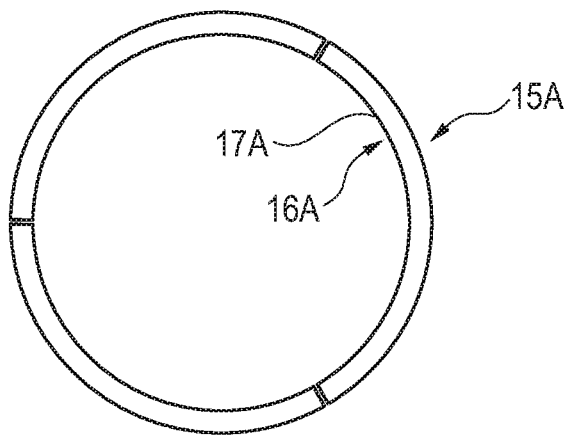
FIG. 16 illustrates the geometry of the internal reflective surface in a cross-section perpendicular to the optical axis
Figure 16C:
Figure 16C:
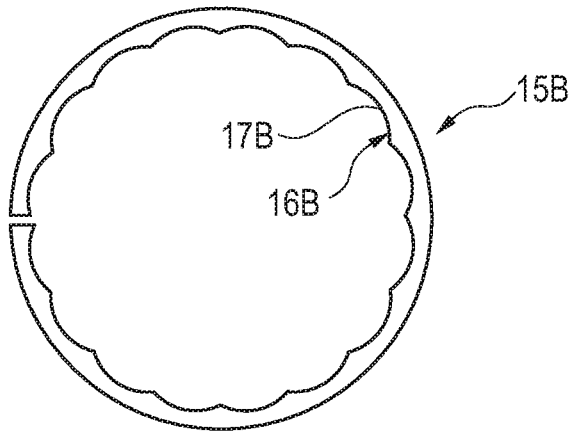
Figure 16C:
Figure 16C:
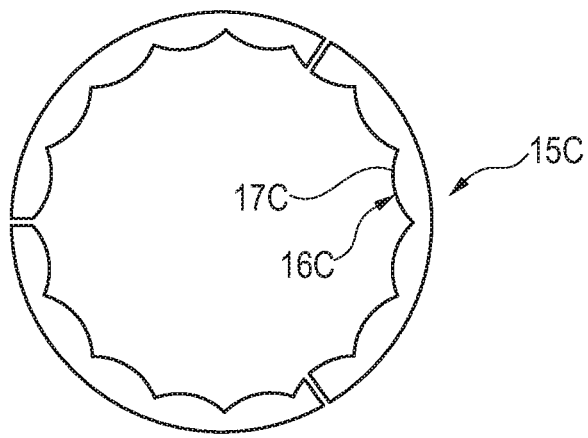

FIG. 16A1 represents a cross-section through the ring-shaped mirror 15A in a plane perpendicular to the optical axis OA and shows that the internal reflective surface 16A of a facet 17A of the mirror is represented by a straight line in that cross-section. In other word, the internal reflective surface of each individual facet is not curved with a finite radius of curvature in a circular direction around the optical axis OA. This is also depicted in FIG. 16A2 showing a 3 dimensional view of a facet 17A. FIG. 16B presents another embodiment wherein the facet 17B is concave (the surface of which is shown in perspective in FIG. 1662) with a radius of curvature of the reflective surface 16B that is smaller or greater than that of the ring's average radius. FIG. 16C presents a further embodiment wherein the facet 17C of the reflective surface 16C is convex.

In an embodiment of, for example, a spectrophotometer, the measurement light is reflected from the sample 20 approximately along the optical axis OA (angle between OA and light rays≤3°≤5°≤30°) into the pick-up optics 30 and on to the detector 32 which generates one or more signals related, for example, to the power spectral density of the detected light.

While the invention has been illustrated and described in detail in the drawings and foregoing description, such illustration and description are to be considered illustrative or exemplary and not restrictive. It will be understood that changes and modifications may be made by those of ordinary skill within the scope of the present invention. In particular, the present invention covers further embodiments with any combination of features from different embodiments described above and below. Additionally, statements made herein characterizing the invention refer to an embodiment of the invention and not necessarily all embodiments.

The terms used in the present specification should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements comprising (e.g. consisting of) A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An illumination device for a spectral optical measurement device, the illumination device comprising:
 a light source arranged with respect to an optical axis of the illumination device which, during a measurement operation, extends along a normal to a center point of an area of a sample to be illuminated; and
 a mirror comprising at least one mirror segment shaped as a ring or as a segment of a ring centered on the optical axis, the mirror segment having an internal reflective surface arranged such that, during the measurement operation, the internal reflective surface receives light emitted from the light source and reflects the light over the area of the sample to be illuminated,
 wherein the mirror segment comprises at least two facets along a direction which runs circularly around the optical axis,
 wherein, in each facet, the internal reflective surface has a freeform shape in a cross-section through the mirror segment in a plane parallel to the optical axis, and
 wherein, in each facet, the internal reflective surface has a shape of a straight line in a cross-section through the mirror in a plane perpendicular to the optical axis.

2. The illumination device according to claim 1, wherein the light source includes a plurality of light-emitting diodes, at least two of the light-emitting diodes being different from each other by having at least one of different colors, different color temperatures, different power spectral distributions and different shapes of radiance.

3. The illumination device according to claim 2, wherein the plurality of light-emitting diodes include four light-emitting diodes, including at least two light-emitting diodes having different spectral power distributions and at least one light-emitting diodes that is larger than one of the other light-emitting diodes.

4. The illumination device according to claim 1, wherein the freeform shape is defined by application of the edge ray principle to a size of the light source, a size of the area of the sample to be illuminated and a cone angle.

5. The illumination device according to claim 1, wherein focusing power of the freeform shape of the internal reflective surface varies along a height of the at least one mirror segment.

6. The illumination device according to claim 1, wherein the mirror includes at least two mirror segments with one or more spaces between the mirror segments, the mirror segments and the spaces together forming the ring.

7. The illumination device according to claim 1, wherein the at least one mirror segment is in the shape of a full ring.

8. The illumination device according to claim 7, wherein the full ring is facetted, comprising multiple facets along a direction which runs circular around the optical axis.

9. The illumination device according to claim 8, wherein a size of the light source is smaller than the area of the sample to be illuminated.

10. A spectral optical measurement device comprising:
 the illumination device according to claim 1 for illuminating a sample; and
 a pick-up optical system for picking up light that has been reflected from the sample;

and a spectrally selective light detector arranged to receive light that has been picked up by the pick-up optical system.

11. A method for illuminating a sample during a measurement operation using the illumination device according to claim 1, the method comprising:

emitting light using a light source arranged with respect to an optical axis of the illumination device which extends along a normal to a center point of an area of a sample which is illuminated during the measurement operation; and deflecting the light by an internal reflective surface of at least one mirror segment of a mirror in a shape of a ring centered on the optical axis, the internal reflective surface being arranged such that the internal reflective surface receives the light emitted from the light source and reflects the light over the area of the sample, the mirror segment comprising at least two facets along a direction which runs circularly around the optical axis, the internal reflective surface in each facet having a freeform shape in a cross-section through the internal reflective surface in plane parallel to the optical axis, and, in a cross-section of the mirror in a plane perpendicular to the optical axis, the internal reflective surface in each facet being represented by a straight line.

12. A method of use of the illumination device according to claim 1, comprising a step of illuminating the sample.

13. A method of use of the spectral optical measurement device according to claim 10, comprising a step of illuminating the sample.

14. An illumination device for a spectral optical measurement device, the illumination device comprising:

a light source arranged with respect to an optical axis of the illumination device which, during a measurement operation, extends along a normal to a center point of an area of a sample to be illuminated; and at least one mirror segment shaped as at least a segment of a ring centered on the optical axis, the mirror segment having an internal reflective surface arranged such that, during the measurement operation, the internal reflective surface receives light emitted from the light source and reflects the light over the area of the sample to be illuminated, the internal reflective surface having a freeform shape in a cross-section through the mirror segment in a plane parallel to the optical axis, and wherein the internal reflective surface has curved shape in a cross-section through the mirror segment in a plane perpendicular to the optical axis, the curved shape being different from the ring shape.

15. The illumination device according to claim 14, wherein in said cross-section in a plane perpendicular to the optical axis, the internal reflective surface is of freeform shape.

16. The spectral optical measurement device according to claim 10, wherein the spectral optical measurement device is configured as a spectrophotometer or a colorimeter.

* * * * *